United States Patent
Luo et al.

(10) Patent No.: US 6,517,245 B2
(45) Date of Patent: Feb. 11, 2003

(54) ADJUSTABLE END CUP FOR LINEAR GUIDE WAY STRUCTURE

(75) Inventors: Bing-Hung Luo, Taichung (TW); Ching-Shan Wu, Miao-Li Hsien (TW)

(73) Assignee: Hiwin Technologies Corp (TW)

( * ) Notice: Subject to any disclaimer, the term of this patent is extended or adjusted under 35 U.S.C. 154(b) by 26 days.

(21) Appl. No.: 09/848,660

(22) Filed: May 4, 2001

(65) Prior Publication Data

US 2002/0164094 A1 Nov. 7, 2002

(51) Int. Cl.[7] ............................................. F16C 29/06
(52) U.S. Cl. ........................................................ 384/45
(58) Field of Search ............................... 384/45, 44, 43; 464/168

(56) References Cited

U.S. PATENT DOCUMENTS 5,380,097 A * 1/1995 Tanaka ........................ 384/45
5,829,885 A * 11/1998 Scheich ....................... 384/45

* cited by examiner

Primary Examiner—Lenard A. Footland
(74) Attorney, Agent, or Firm—Charles E. Baxley

(57) ABSTRACT

A linear guide way structure comprises a guide rail, a slider, and two end cups. The slider has two ends each defining a ball return hole having a first-end-opening, and a ball groove having a second-end-opening. The adjustable end cup is provided with two ball direction changing paths each having a first-mating-end-opening abutting the first-end-opening of the ball return hole, and a second-mating-end-opening abutting the second-end-opening of the ball groove. The adjustable end cup is provided with a plurality of adjusting slits, and at least one of the adjusting slits has a determined depth so that the adjustable end cup is made flexible, thereby adjusting the distance between the two first-mating-end-openings of each of the two ball direction changing paths of the adjustable end cup, so that the first-mating-end-opening can be exactly engaged with the first-end-opening of the ball return hole.

4 Claims, 6 Drawing Sheets

ADJUSTABLE END CUP FOR LINEAR GUIDE WAY STRUCTURE

BACKGROUND OF THE INVENTION

1. Field of the Invention

The present invention relates to an adjustable end cup, and more particularly to an adjustable end cup for a linear guide way structure.

2. Description of the Related Art

A conventional linear guide way structure in accordance with the prior art shown in FIGS. 4 and 5 (patent U.S. Pat. No. 6,109,789) comprises a guide rail 10, a slider 11 with a guide way slot 13 moveably mounted on the guide rail 10, and two end cups 12 each secured to the slider 11 by bolts 16. The slider 11 has two ball return holes 141 for allowing passage of balls 15. Each of the two end cups 12 is rested on one side of the slider 1, and is provided with the C-shaped ball direction changing paths 142 each having an end opening 143 abutting the ball return hole 141 of the slider 11.

As shown in FIG. 6, another embodiment of the prior art, the slider 11 has two end faces each defining two positioning recesses 18, and each of the two end cups 12 is provided with two positioning projections 17 each secured in the positioning recess 18, thereby securing the slider 11 with the end cups 12.

In practice, the ball return hole 141 and the ball direction changing path 142 are used for allowing passage of the balls 15, so that when the connecting point is not smooth the rolling movement of the balls 15 are not fluent, thereby producing noise, vibration, and increasing friction force during movement of the balls 15.

However, the conventional linear guide way structure in accordance with the prior art has the following disadvantages.

1. The end cup 12 is made of plastic material. While the temperature of the mold is gradually increased during the molding injection process, the mold will vary with change of the environmental temperature, so that the size of the end cup will vary due to the change of the temperature of the mold.

2. The end cup 12 made of plastic material is easily deformed due to the influence of the environmental temperature and moisture so that the ball return hole 141 of the slider 11 can not exactly aligned with the ball direction changing path 142 of the end cup 12 during the assembly process of the slider 11 and the end cup 12, thereby causing inconvenience.

3. When the material is expanded or contracted, the distance between the two positioning projections 17 of the end cup 12 will vary, so that one positioning projection 17 can not inserted into the positioning recess 18 when the other positioning projection 17 inserted in the other positioning recess 18.

4. The end cup 12 is easily subjected to a deformation due to the influence of the environmental temperature and moisture so that even if the end cup 12 is assembled with the slider 11, the ball return hole 141 of the slider 11 is easily deviated and detached from the end opening 143 of the ball direction changing path 142 of the end cup 12 due to deformation of the end cup 12, thereby producing an apparent gap at the joint of the ball return hole 141 and the end opening 143 of the ball direction changing path 142.

SUMMARY OF THE INVENTION

The present invention has arisen to mitigate and/or obviate the disadvantage of the conventional linear guide way structure.

In accordance with one aspect of the present invention, there is provided an adjustable end cup in combination with a linear guide way structure, the linear guide way structure comprising a guide rail, a slider having two ends each defining some ball return hole having a first-end-opening and ball groove having a second-end-opening, two adjustable end cups each having an end face rested on an end face of the slider. The adjustable end cup provided with some ball direction changing paths each having a first-mating-end-opening abutting the first-end-opening of the ball return hole, and a second-mating-end-opening abutting the second-end-opening of the ball groove.

The adjustable end cup of the present invention is provided with some adjusting slits, and at least one of the adjusting slits has a determined depth so that the adjustable end cup is made flexible at the adjusting slits, thereby adjusting the distance between the two first-mating-end-opening of each of the two ball direction changing paths of said adjustable end cup, so that the first-mating-end-opening of each of the two ball direction changing paths of the adjustable end cup can be exactly engaged with the first-end-opening of the ball return hole of the slider. And the second-mating-end-opening of each of the two ball direction changing paths of the adjustable end cup can be exactly engaged with the second-end-opening of the ball groove of the slider too.

Further benefits and advantages of the present invention will become apparent after a careful reading of the detailed description with appropriate reference to the accompanying drawings.

DETAILED DESCRIPTION OF THE INVENTION

Figure 1:
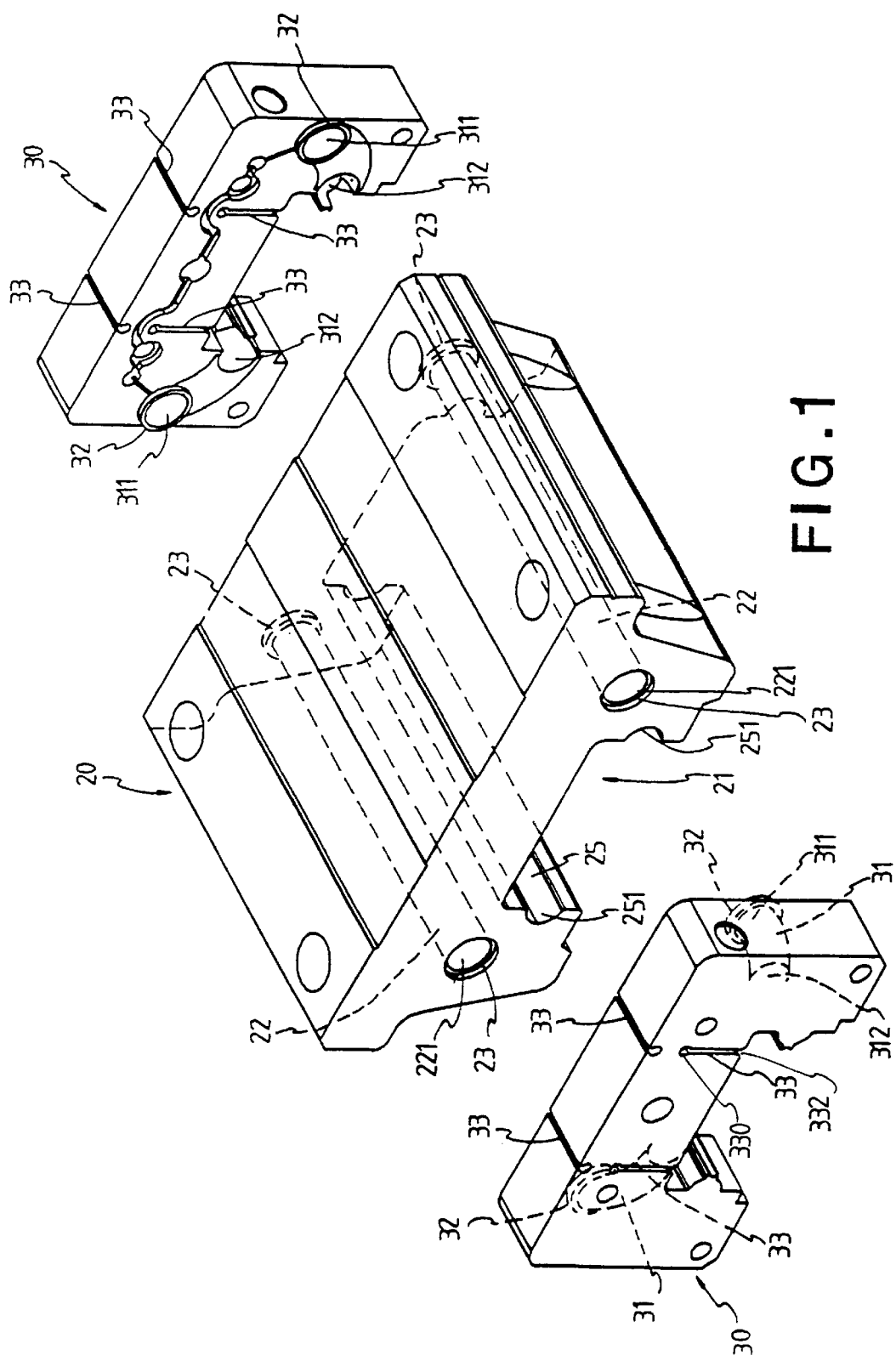
FIG. 1 is an exploded view of a linear guide way structure in accordance with the first embodiment of the present invention.
Figure 2:
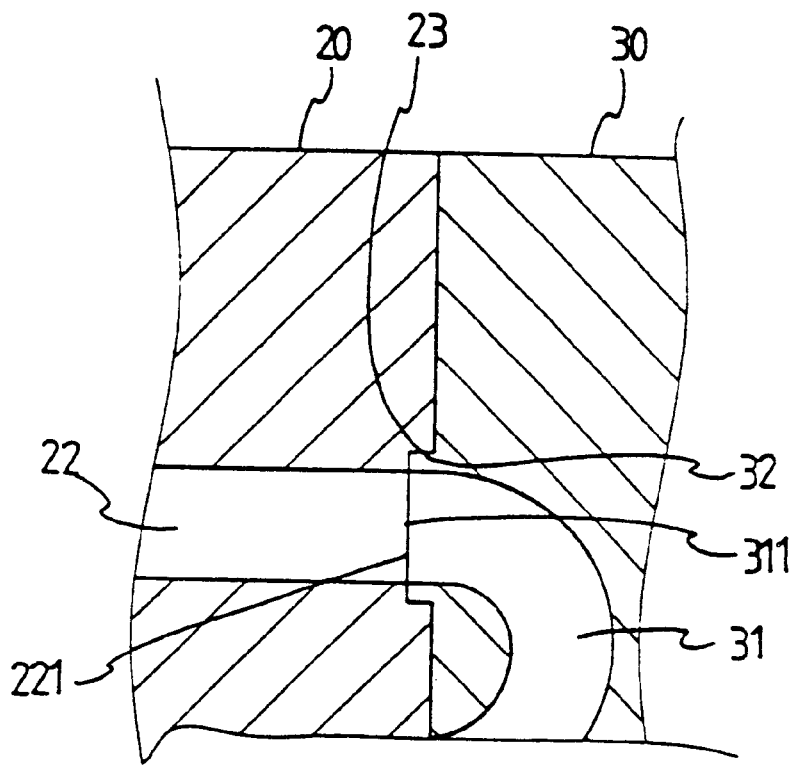
FIG. 2 is a partially cut-away side cross-sectional assembly view of the linear guide way structure as shown in FIG. 1.

Referring to the drawings and initially to FIGS. 1 and 2, a linear guide way structure in accordance with the first embodiment of the present invention includes a slider 20 made of metal, and two adjustable end cups 30 each made of plastic material.

The slider 20 has two opposite sides and two opposite ends. Each of the two ends of the slider 20 defines an elongated ball return hole 22 having two distal ends each defining a first-end-opening 221, and a ball groove 25 located adjacent to the ball return hole 22 and having two distal ends each defining a second-end-opening 251.

The elongated ball return hole 22 is of a linear type for allowing passage of balls (not shown), thereby serving as the path of the balls. The ball groove 25 also allows rolling movement of the balls.

Each of the two adjustable end cups 30 has an end face rested on an end face of the slider 20, and is provided with two spaced opposite C-shaped ball direction changing paths 31. Each of the two C-shaped ball direction changing paths 31 has a first side provided with a first-mating-end-opening 311 abutting the first-end-opening 221 of the ball return hole 22, and a second side provided with a second-mating-end-opening 312 abutting the second-end-opening 251 of the ball groove 25.

The first-end-opening 221 of the ball return hole 22 is integrally formed with a positioning recess 23, and the first-mating-end-opening 311 of each of the two ball direction changing paths 31 is integrally formed with an insertion flange 32 secured in the positioning recess 23, so that the first-mating-end-opening 311 of each of the two ball direction changing paths 31 is rigidly engaged with the first-end-opening 221 of the ball return hole 22.

Each of the two adjustable end cups 30 is provided with a plurality of adjusting slits 33, and two of the adjusting slits 33 has a determined depth so that the adjustable end cup 30 is made flexible at the adjusting slits 33, thereby adjusting the distance between the two first-mating-end-opening 311 of each ball direction changing paths 31, so that the first-mating-end-opening 311 of each of the two ball direction changing paths 31 can be exactly engaged with the first-end-opening 221 of the ball return hole 22 of the slider 20, and the second-mating-end-opening 312 of each of the two ball direction changing paths 31 can be exactly engaged with the second-end-opening 251 of the ball groove 25 of the slider 20.

The slider 20 defines a guide way slot 21 for moveably engaging with a guide rail (not shown), and two adjusting slits 33 of the adjustable end cup 30 located adjacent to the guide way slot 21 of the slider 20 each have an apparent depth so that the distance between the two first-mating-end-opening 311 of the two ball direction changing paths 31 can be enlarged.

In assembly, when the end cup 30 is assembled with the slider 20, by means of bending the adjustable end cup 30, the end cup 30 can be properly deformed at the adjusting slits 33 position so that the insertion flange 32 of the end cup 30 can be easily and forcibly inserted into the positioning recess 23 of the slider 20, such that the first-mating-end-opening 311 of each of the two ball direction changing paths 31 of the adjustable end cup 30 can be exactly and rigidly engaged with the first-end-opening 221 of the ball return hole 22 of the slider 20.

When the end cup 30 is deformed due to the influence of the environmental temperature and moisture, the rigid engagement between the insertion flange 32 of the end cup 30 and the positioning recess 23 of the slider 20 will provide a force to resist the slider movement of the joint of the first-end-opening 221 and the first-mating-end-opening 311. In addition, by provision of the adjusting slits 33 on the end cup 30, the force exerted on the joint of the insertion flange 32 of the end cup 30 and the positioning recess 23 of the slider 20 due to expansion or contraction of the material can be reduced. Therefore, even when the material is expanded or contracted, the first-mating-end-opening 311 of the ball direction changing path 31 of the adjustable end cup 30 will not detach from the first-end-opening 221 of the ball return hole 22 of the slider 20.

Figure 3:
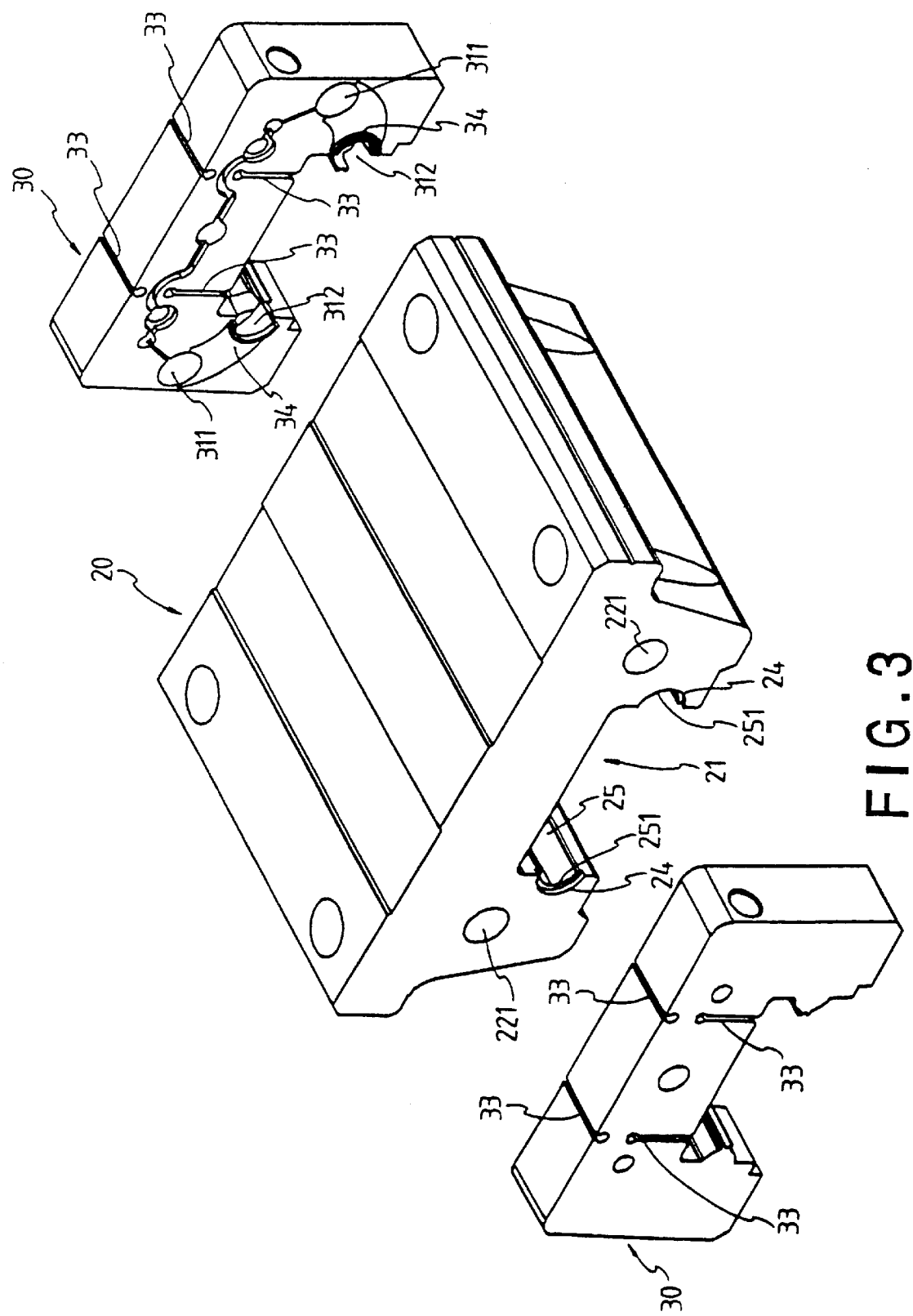
FIG. 3 is an exploded view of a linear guide way structure in accordance with the second embodiment of the present invention.
Figure 4:
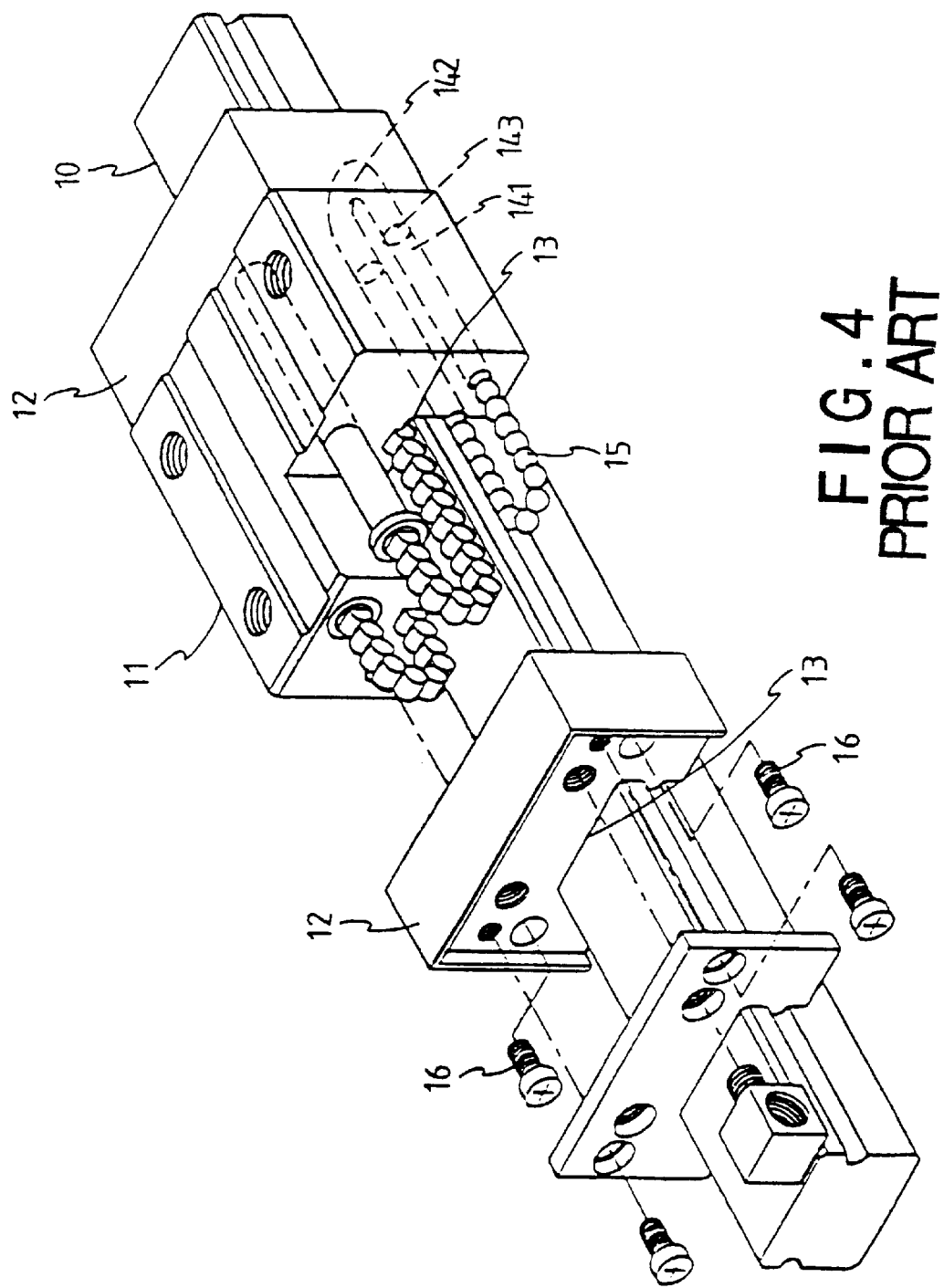
FIG. 4 is an exploded view of a conventional linear guide way structure in accordance with the prior art.
Figure 5:
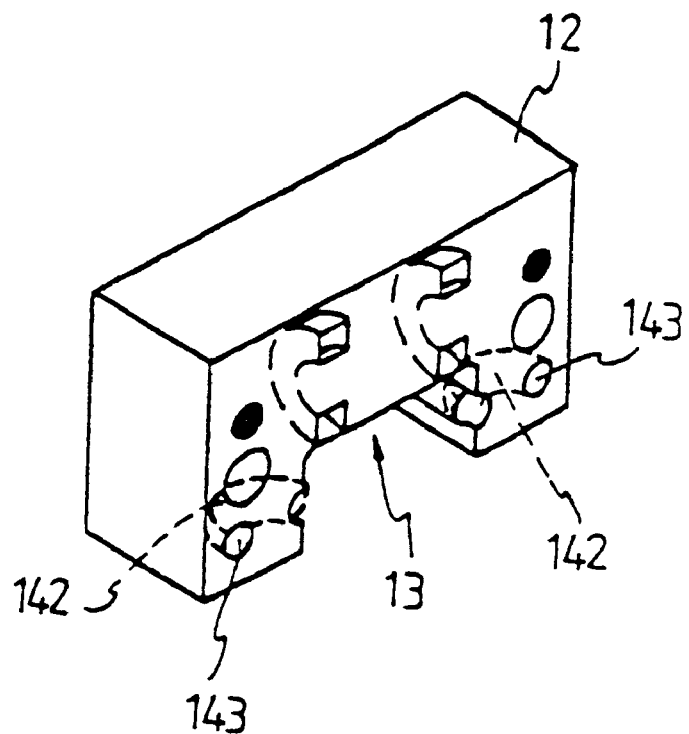
FIG. 5 is a perspective view of an end cup of the linear guide way structure as shown in FIG. 4.
Figure 6:
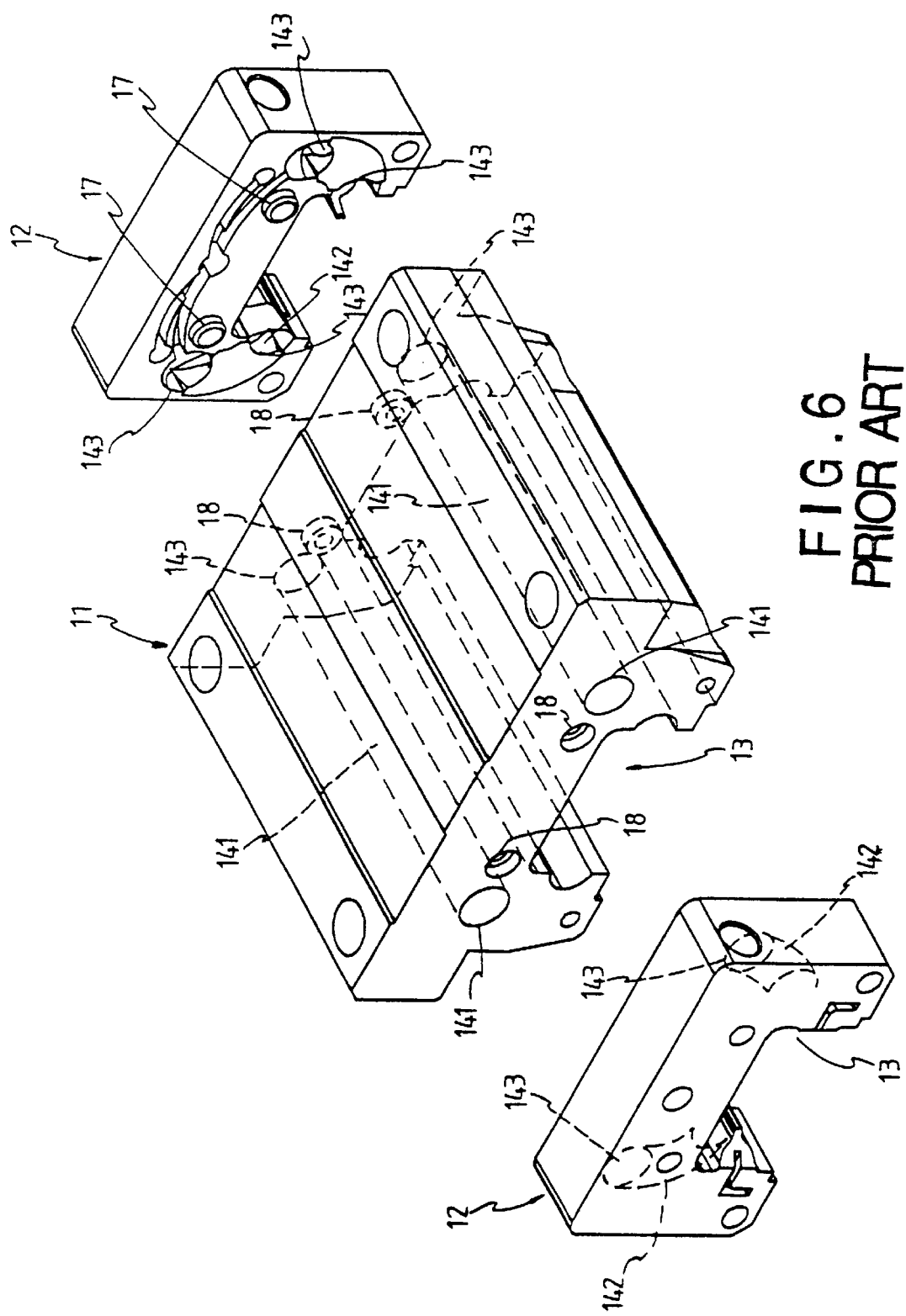
FIG. 6 is an exploded view of the conventional linear guide way structure in accordance with another embodiment of the prior art.

Referring to FIG. 3, in accordance with a second embodiment of the present invention, the second-end-opening 251 of the ball groove 25 is integrally formed with a positioning recess 24, and the second-mating-end-opening 312 of each of the two ball direction changing paths 31 of the adjustable end cup 30 is integrally formed with a semi-circular insertion flange 34 secured in the positioning recess 24 of the slider 20, so that the second-mating-end-opening 312 of each of the two ball direction changing paths 31 of the adjustable end cup 30 is rigidly engaged with the second-end-opening 251 of the ball groove 25 of the slider 20.

It should be clear to those skilled in the art that further embodiments may be made without departing from the scope of the present invention.

What is claimed is:

1. An adjustable end cup in combination with a linear guide way structure, said linear guide way structure comprising a guide rail, a slider (20) with guide way slot (21) moveably mounted on said guide rail, and two said adjustable end cups (30); said slider (20) having ball return holes (22) having first-end-openings (221), and ball grooves (25) having second-end-openings (251); said adjustable end cup (30) having an end face rested on an end face of said slider (20) and provided with ball direction changing paths (31) each having a first-mating-end-opening (311) abutting said first-end-opening (221) of said ball return hole (22), and a second-mating-end-opening (312) abutting said second-end-opening (251) of said ball groove (25), wherein, said adjustable end cup (30) is provided with a adjusting slit (33) which has a determined depth so that said adjustable end cup (30) is made flexible at said adjusting slit (33), thereby adjusting the distance between said two first-mating-end-openings (311) of each of said two ball direction changing paths (31) of said adjustable end cup (30), so that said first-mating-end-opening (311) of each of said two ball direction changing paths (31) of said adjustable end cup (30) can be engaged with said first-end-opening (221) of said ball return hole (22) of said slider (20), and said second-mating-end-opening (312) of each of said two ball direction changing path (31) of said adjustable end cup (30) can be engaged with said second-end-opening (251) of said ball groove (25) of said slider (20) better.

2. The adjustable end cup in combination with a linear guide way structure in accordance with claim 1, wherein said adjusting slits (33) of said adjustable end cup (30) located adjacent to said guide way slot (21) of said slider (20) has an apparent depth so that the distance between the two first-mating-end-openings (311) of the two ball direction changing paths (31) can be enlarged.

3. The adjustable end cup in combination with a linear guide way structure in accordance with claim 1, wherein said first-end-opening (221) of said ball return hole (22) of said slider (20) is integrally formed with a positioning recess (23), and said first-mating-end-opening (311) of said ball direction changing paths (31) of said adjustable end cup (30) is integrally formed with an insertion flange (32) secured in said positioning recess (23) so that said first-mating-end-opening (311) is rigidly engaged with said first-end-opening (221).

4. The adjustable end cup in combination with a linear guide way structure in accordance with claim 1, wherein said second-end-opening (251) of said ball groove (25) of each of said slider (20) is integrally formed with a positioning recess (24), and said second-mating-end-opening (312) of said ball direction changing path (31) of said adjustable end cup (30) is integrally formed with an insertion flange (34) secured in said positioning recess (24) so that said second-mating-end-opening (312) is rigidly engaged with said second-end-opening (251).

* * * * *